(12) United States Patent
Trudnak et al.

(10) Patent No.: US 11,179,006 B2
(45) Date of Patent: Nov. 23, 2021

(54) SUPPORT STRUCTURE FOR COOKING FOOD

(71) Applicants: Robert Trudnak, Lansdale, PA (US); Eric Fulmer, Norristown, PA (US)

(72) Inventors: Robert Trudnak, Lansdale, PA (US); Eric Fulmer, Norristown, PA (US)

(73) Assignee: THERM-OMEGA-TECH, INC., Warminster, PA (US)

( * ) Notice: Subject to any disclaimer, the term of this patent is extended or adjusted under 35 U.S.C. 154(b) by 0 days.

(21) Appl. No.: 16/182,985

(22) Filed: Nov. 7, 2018

(65) Prior Publication Data

US 2019/0246839 A1 Aug. 15, 2019

Related U.S. Application Data

(63) Continuation-in-part of application No. 29/637,191, filed on Feb. 14, 2018, now Pat. No. Des. 837,593.

(51) Int. Cl.
*A47J 37/07* (2006.01)
*A47J 37/06* (2006.01)

(52) U.S. Cl.
CPC ....... *A47J 37/0786* (2013.01); *A47J 37/0694* (2013.01)

(58) Field of Classification Search
CPC ............... A47J 37/0786; A47J 37/0694; A47J 37/1295; B65D 7/20; A47L 15/505; F23G 5/42; A61L 2/26; F23H 13/00; F24B 1/193; A47F 5/01

USPC ............... D7/409, 704; 211/74, 59.2, 181.1; 248/175; 312/42
See application file for complete search history.

(56) References Cited

U.S. PATENT DOCUMENTS

| | | | | | |
|---|---|---|---|---|---|
| 72,770 | A | * | 12/1867 | Woods | A47F 7/0064 211/85.31 |
| D31,043 | S | * | 6/1899 | Smith | D7/409 |
| 1,426,931 | A | * | 8/1922 | Walker | A47L 15/50 220/572 |
| 1,530,175 | A | * | 3/1925 | Hatch, Jr. | A47J 47/16 220/6 |
| 2,552,983 | A | * | 5/1951 | Lee | A61L 2/26 422/310 |
| 3,061,135 | A | * | 10/1962 | Martin | B65D 7/20 220/485 |
| 3,347,404 | A | * | 10/1967 | McIntyre | A47J 27/122 220/486 |
| 4,296,726 | A | * | 10/1981 | Ross | A47J 37/079 126/25 B |
| 4,458,585 | A | | 7/1984 | Erbach | |
| 4,858,772 | A | * | 8/1989 | Phillipson | A47B 49/00 211/36 |
| 5,088,618 | A | * | 2/1992 | Colombo | A47L 13/51 206/216 |
| 5,195,424 | A | * | 3/1993 | Guajaca | A47J 27/04 126/348 |
| D339,266 | S | * | 9/1993 | Lockett | D7/323 |
| 5,529,053 | A | * | 6/1996 | Carter | A47J 37/0704 126/25 R |
| D371,719 | S | * | 7/1996 | Perry | D7/388 |

(Continued)

*Primary Examiner* — Jorge A Pereiro
(74) *Attorney, Agent, or Firm* — Cusick IP, PLLC; Clinton J. Cusick, Esq.

(57) ABSTRACT

A food support structure provides spacing rings and elevation to provide spacing and support for food items to optimize the cooking space of a round cooking device.

16 Claims, 5 Drawing Sheets

(56) References Cited

U.S. PATENT DOCUMENTS

| | | | | |
|---|---|---|---|---|
| 5,562,023 A | | 10/1996 | Harrison | |
| 5,722,390 A | * | 3/1998 | Hannebaum | F24B 1/193 126/152 B |
| D397,584 S | * | 9/1998 | Vannello | D7/388 |
| 5,924,458 A | * | 7/1999 | Kaines | B21F 15/06 138/172 |
| 6,196,115 B1 | * | 3/2001 | Tsao | A47J 27/13 126/20 |
| D446,688 S | * | 8/2001 | Vanello | D7/601 |
| 6,272,975 B1 | * | 8/2001 | Usherovich | A47J 37/047 99/331 |
| D481,885 S | * | 11/2003 | Sellers | D6/403 |
| D531,543 S | * | 11/2006 | Peter | D6/513 |
| D542,092 S | | 5/2007 | Raichlen et al. | |
| 7,281,469 B1 | | 10/2007 | Barbour et al. | |
| D568,684 S | | 5/2008 | Tiemann | |
| D599,167 S | * | 9/2009 | Tiemann | D7/409 |
| D615,355 S | * | 5/2010 | Viahos | D7/409 |
| D623,014 S | * | 9/2010 | Alden | D7/409 |
| D648,174 S | | 11/2011 | Lu | |
| D650,225 S | * | 12/2011 | Bartol | D7/354 |
| D658,939 S | | 5/2012 | Adams et al. | |
| D667,655 S | | 9/2012 | Goodman | |
| D699,073 S | | 2/2014 | Cheung | |
| D702,501 S | | 4/2014 | Hand | |
| D716,609 S | * | 11/2014 | Greer | D7/409 |
| D751,186 S | * | 3/2016 | Romzek | D23/410 |
| D780,514 S | * | 3/2017 | Mitten | D7/409 |
| 9,867,300 B1 | * | 1/2018 | Fowler, Jr. | B65H 57/06 |
| D878,879 S | * | 3/2020 | Blackketter | D8/1 |
| 2003/0005828 A1 | * | 1/2003 | McLemore | A47J 37/1295 99/403 |
| 2011/0061545 A1 | * | 3/2011 | Foster | A47J 37/1219 99/407 |
| 2011/0155118 A1 | * | 6/2011 | Ahmed | A47J 37/0682 126/39 R |
| 2012/0012011 A1 | * | 1/2012 | Millikin | A47J 37/1204 99/410 |
| 2012/0107476 A1 | * | 5/2012 | McLemore | A47J 37/07 426/523 |
| 2012/0204732 A1 | * | 8/2012 | Dondurur | A47J 37/041 99/427 |
| 2013/0247898 A1 | * | 9/2013 | Balcerzak | A47J 37/0786 126/25 R |

* cited by examiner

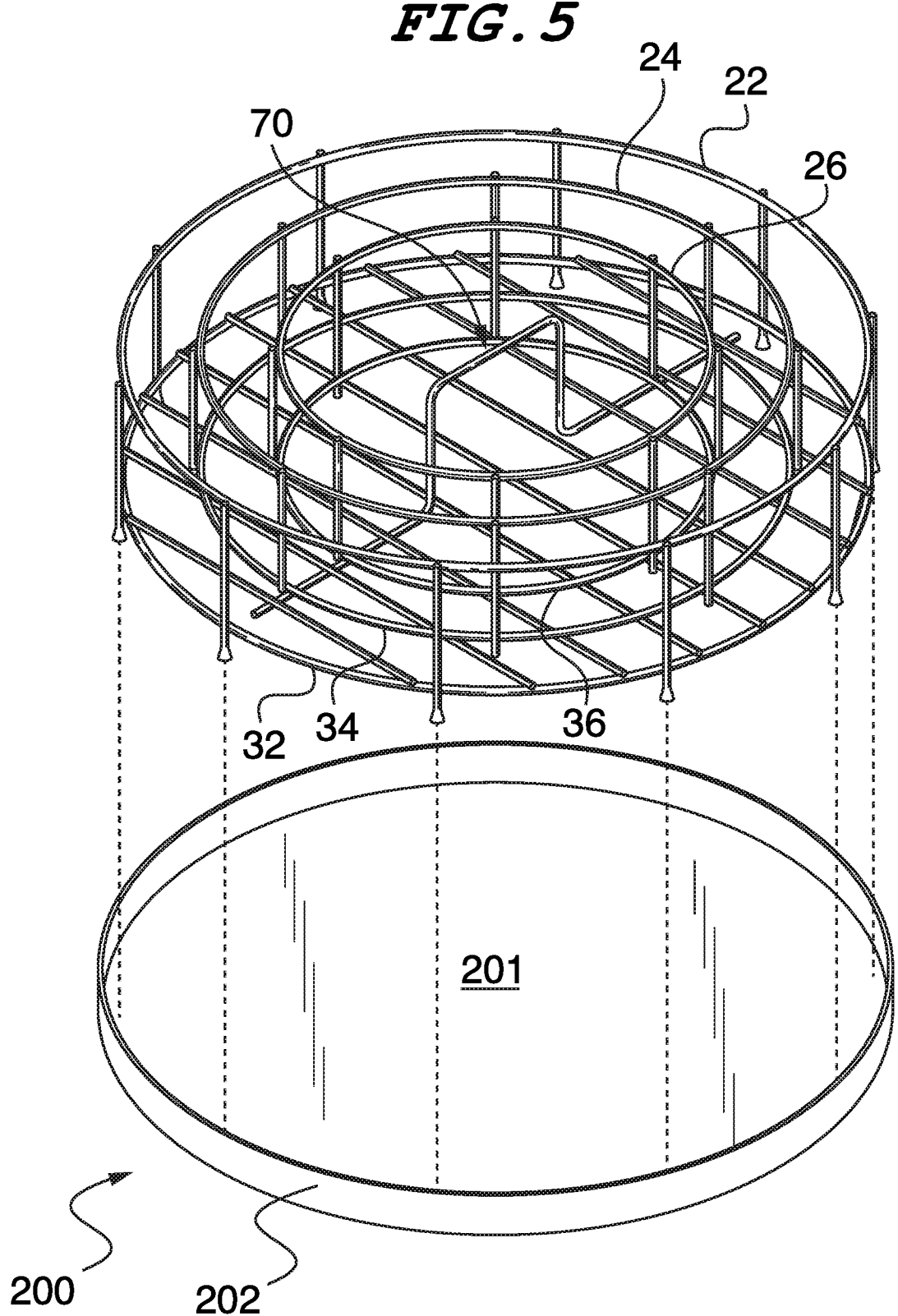

SUPPORT STRUCTURE FOR COOKING FOOD

CROSS REFERENCE TO RELATED APPLICATIONS

This application is a continuation in part of U.S. Application Ser. No. 29/637,191 filed on Feb. 14, 2018.

BACKGROUND OF THE INVENTION

Field of the Invention

The present general inventive concept is directed to an apparatus for cooking food in a space efficient manner. A rounded cooking structure is provided that corresponds to the shape of cooking grills and smokers configured with a rounded cross section.

Description of the Related Art

Conventional indoor ovens have been sized to fit with countertops and are generally square. Cookware for ovens has corresponded to the same shape as ovens and baking ware is predominantly square or rectangular in shape. Recent advances in temperature control for outdoor ovens, smokers, and grills have resulted in increased utility and popularity of outdoor cooking. Kamodo style smokers and metal charcoal grills provide predominantly circular grates and cooking surfaces. Cookware that is rectangular does not effectively utilize the surface area available in round ovens. For example the RIB RACK WITH SAUCE PAN in U.S. Pat. No. 5,562,023 is shown for use in a round cooker, but the support structure for the food items is shown as rectangular. It is a common desire to arrange food efficiently when cooking for a long time. Whereas grilled food that is cooked quickly such as hot dogs and hamburgers can be cooked sequentially with a short batch time, smoked items and slow cooked items that may require a full day of cooking time must be prepared well in advance. Maximizing cooking space in an outdoor cooker is a long-felt need. Numerous other attempts have been made to stack or support meat items including racks of ribs.

Design Pat. No. D658,939 to Adams entitled RIB RACK provides a number of support rows arranged linearly. This product provides spacing between the food items, but does not efficiently utilize space in a round cooker. Design Pat. No. D542,092 to Raichlen provides four parallel slots and a more substantial support base, but again does not efficiently utilize space in a round cooker. Design Pat. No. D568,684 provides a rectangular rack with five disparate circular openings that can each be used to support a food item. Design Pat. D599,167 provides three separate circular support frames. These circular supports can support a food item such as a chicken. In order to fit a rack of ribs within the circular support, they must be wound tightly, and this prevents air flow to the surface of the food item. The device provides support, but it does not provide adequate spacing for slow cooking. In a smoker, air flow is important to impart flavor and texture. Meat items that are not contacted by hot and/or dry air do not develop bark or outer crust that distinguishes the exterior of the meat item from the texture of the interior.

What is needed is a device that utilizes the surface area of a round cooker and conforms food items into a space efficient configuration while providing support, and maintains spacing between the food items to provide air flow to the surface of the food items.

SUMMARY OF THE INVENTION

It is an aspect of the present invention to provide a support structure for cooking food that efficiently arranges food items. Outdoor cookers and smokers are commonly rounded in cross section and provide rounded or circular cooking areas. A food support device that is round and efficiently supports and retains food items can maximize the food production on a round shaped cooking device.

The above aspects can be obtained by a food support device comprising a plurality of spacing rings and at least one support ring connected by a base support member. The spacing rings can be positioned by connection with a plurality of elevation support members. Spacing rings can be concentric and positioned above a corresponding support ring. A handle support also can serve as a carrying handle and as a food support attached to base support members. The objects of the invention can also be accomplished by a circular food support device comprising a first plurality of concentric rings defining a first plane and a second plurality of concentric rings defining a second plane where a plurality of ring support members connect the rings in the first plane to the rings in the second plane and a plurality of base support members in the second plane fixedly connect the plurality of rings in the second plane to provide consistent spacing.

A method of constructing a food support device is disclosed comprising the steps of: attaching a plurality of inner ring support members to a first inner ring and a second inner ring; attaching a plurality of medial ring support members to a first medial ring and a second medial ring; attaching a plurality of elevation support members to a first outer ring and a second outer ring; attaching a plurality of base support members from a first side of the first outer ring to a second side of the first outer ring; and attaching at least one of the base support members to the first inner ring and the first medial ring to maintain the spacing of the first medial ring between the first outer ring and the first inner ring and establish a plane containing at least one base support member and the first inner ring, first medial ring, and first outer ring.

These together with other features, aspects, and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 5 is a perspective view of a circular cooking support in an embodiment of the invention comprising a drip pan.

DESCRIPTION OF THE PREFERRED EMBODIMENTS

Figure 1:
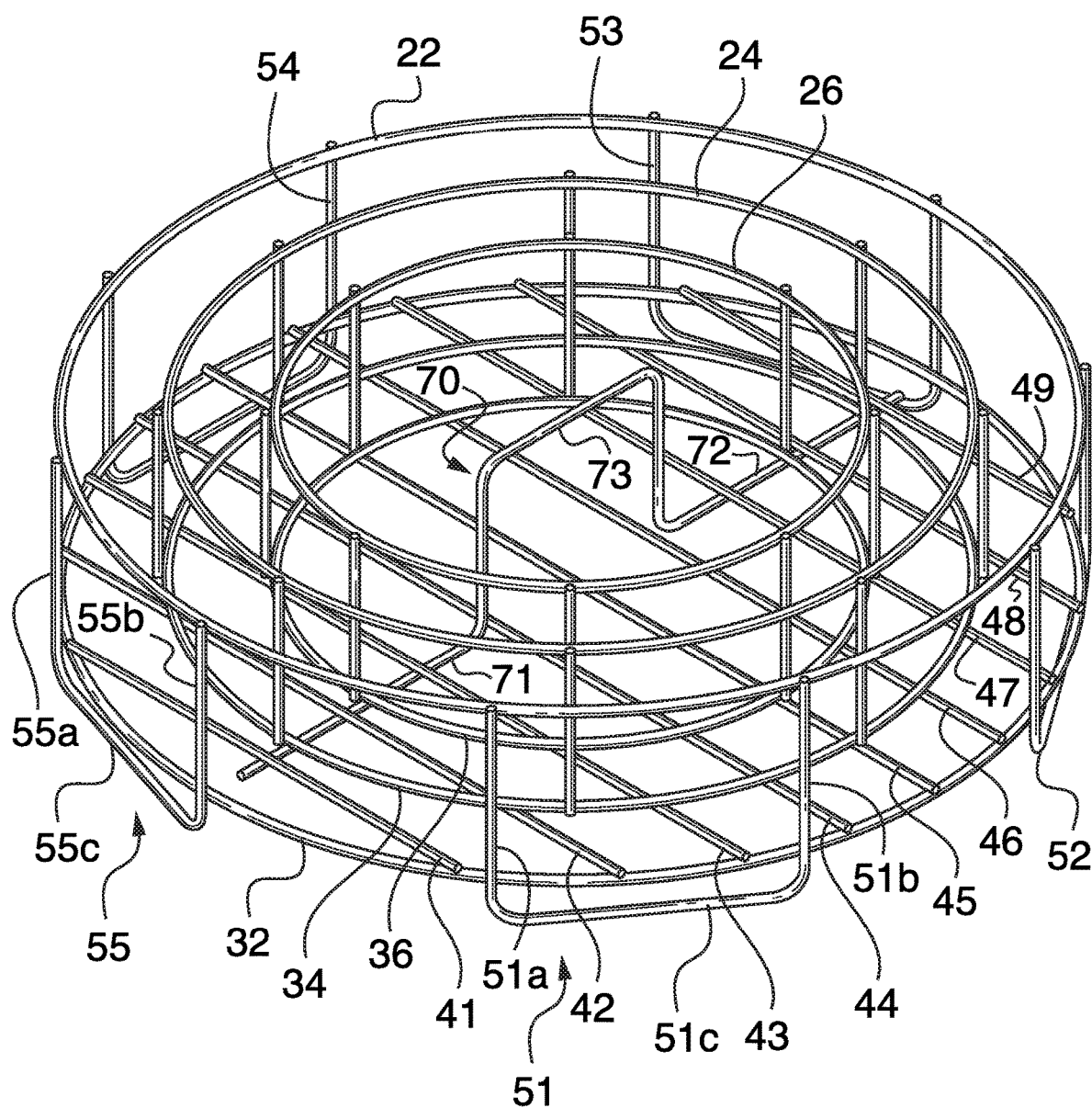
FIG. 1 is a perspective view of a circular cooking support in an embodiment of the invention.

Reference will now be made in detail to the presently preferred embodiments of the invention, examples of which are illustrated in the accompanying drawings, wherein like reference numerals refer to like elements throughout.

The present inventive concept relates to a method and apparatus for arranging and retaining food items. The device can optimally be used to arrange slabs of meat such as beef ribs or pork ribs or other food items that are extensive in size and the device can efficiently support food items in a concentric arrangement to optimize available cooking area. The device of the invention can also be used to support and suspend a number of smaller food items such as chicken wings or chicken parts. The device of the invention can also be used to suspend numerous items such as strips of pork belly to be smoked or thin strips of meat to make jerky, for example beef jerky. In an embodiment, a circular drip pan can be provided to provide a level support, catch drippings, or to hold liquids including beer or water to add moisture or flavor during cooking.

FIG. 1 presents a perspective view of an embodiment of the invention. The device of the invention is preferably composed of heat resistant materials. Metal is readily available, and aluminum, stainless steel, food grade stainless steel, or nickel plated carbon steel can be utilized in an embodiment of the invention. A rod of metal can be shaped and connected, for example by welding, or copper brazing, to provide the configuration of the desired device. Other connection methods or materials such as aluminum plating, copper plating, or chrome plating can be used to create an advantageous surface in conjunction with materials suitable for use with food.

An embodiment of the invention comprises a plurality of support rings. Outer support ring 32 and medial support ring 34 and inner support ring 36 can be circular and can be arranged concentrically. Medial support ring 34 can be placed equidistant from outer support ring 32 and inner support ring 36 to provide equivalent spacing. The support rings all can be oriented in the same horizontal level defined by the outer support ring that can be referred to as a base plane. A corresponding plurality of spacing rings can be positioned within a top plane that can be parallel to the base plane as shown in the embodiment in FIG. 1. Outer spacing ring 22 and medial spacing ring 24 and inner spacing ring 26 can be oriented concentrically as shown and can be evenly spaced. In an embodiment, each of the spacing rings can be positioned above a corresponding support ring and connected by a plurality of ring support members. The rings can be unevenly spaced as desired in different embodiments.

Figure 2:
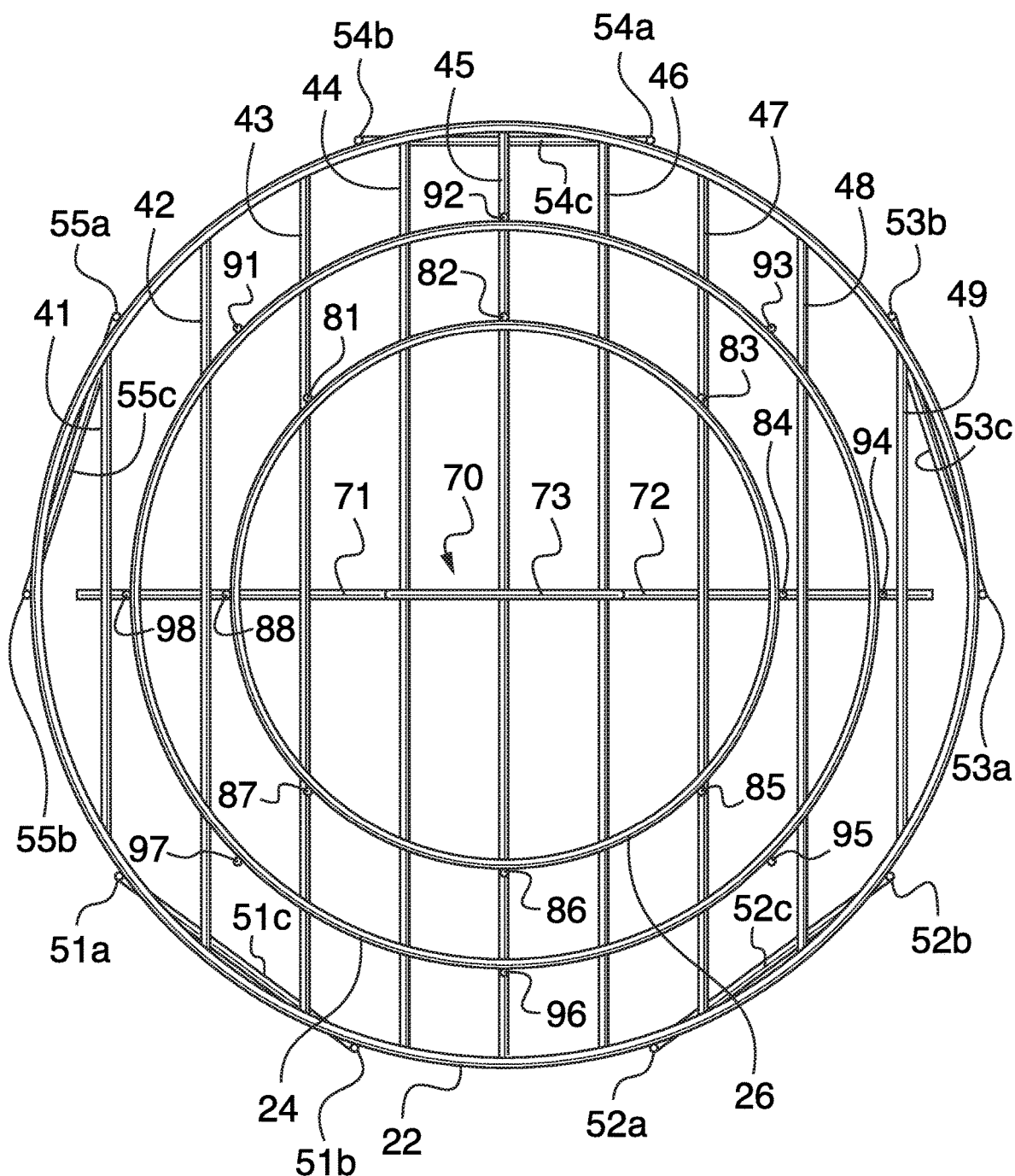
FIG. 2 is a top view of a circular cooking support in an embodiment of the invention.

FIG. 2 presents a top view of an embodiment of the invention. Inner spacing ring 26 can be connected to inner support ring 36 by a plurality of inner ring support members. In this embodiment, eight inner ring support members numbered 81 through 88 are shown in FIG. 2. In order to orient a spacing ring parallel to a support ring, the inner ring support members 81 through 88 can be nominally the same length and each can be welded to a spacing ring in the top plane and a support ring in the base plane. Here, inner spacing ring 26 is set parallel to the base plane by the equivalent length of the inner ring support members 81 through 88. In other embodiments, spacing rings, for example medial spacing ring 24 can be positioned at different selected heights by utilizing a plurality of medial ring support members, for example medial ring support members 91 through 98, of different lengths.

A plurality of base support members can be provided to add stability to the device as well as provide a barrier to prevent food items from falling through the device. In a particular embodiment, base support members can be positioned in the base plane and parallel to each other. Base support members 41 through 49 are shown in FIG. 1 extending from a first side of outer support ring 32 to a second side of outer support ring 32. It will be understood that more support members can be provided with closer spacing and that fewer support members can be provided with increased spacing to provide the structural benefit of connecting the support rings in fixed arrangement, maintaining spacing between said support rings, and preventing food items from falling through the device. Inner spacing ring 26 defines a central opening. In an embodiment with three spacing rings, spacing between the rings suggests it is beneficial to provide five or more base support members so that one is positioned in each of the spaces between the rings where the circumference of the spacing ring is approximately parallel to the base support member. By way of illustration, in a particular embodiment in FIG. 2, first base support member 41 is shown between outer spacing ring 22 and medial spacing ring 24. Second base support member 42 is present, in part, between medial spacing ring 24 and inner spacing ring 26. Third base support member 43 is present in part in the central opening. In an alternate embodiment, the device of the invention can be constructed without the support rings. In that embodiment, medial ring support members 91, 93, 95, and 97 can be connected to both a medial spacing ring 24 and a horizontal base support member, for example medial ring support members 91 and 97 can be connected to second base support member 42 and medial ring support members 93 and 95 can be connected to eighth base support member 48. It will be understood that inner ring support members and medial ring support members can be vertical or diagonal or curved and provide support to a spacing ring above the base plane. Ring support members that are perpendicular to at least one ring provide the shortest distance between rings.

Figure 4:
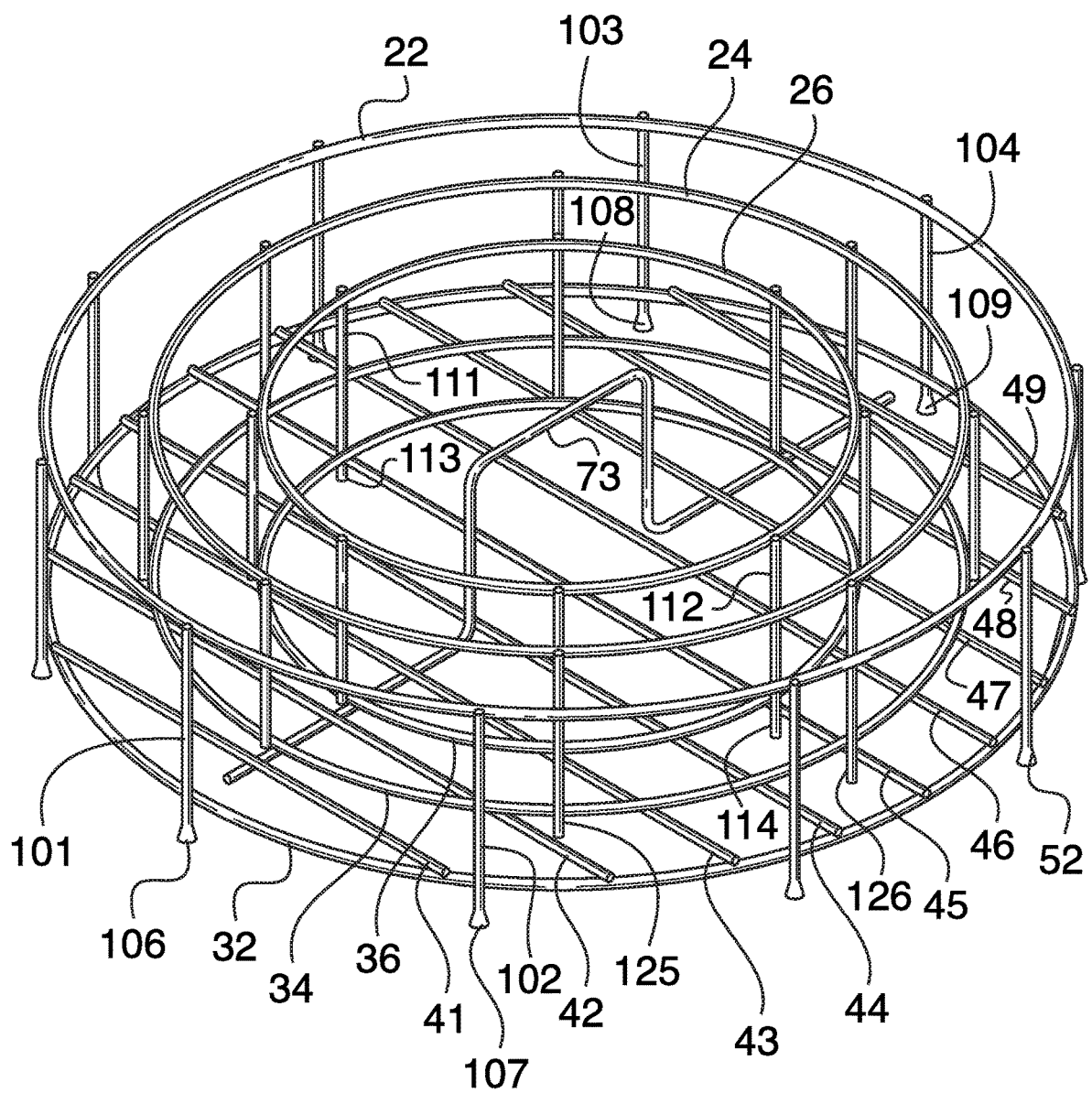
FIG. 4 is a perspective view of a circular cooking support in an embodiment of the invention.

With food items positioned within the device, it is desirable to provide air flow around the food items. This can be improved by elevation of the base plane of the device above a cooking structure, such as a grill or grate or drip pan. First elevation support member 51 provides both structural support between outer support ring 32 and outer spacing ring 22, but also provides elevation of the base plane. First elevation support member 51 can comprise a ring support member of increased length so that it extends below the base plane and provides a peg or post. A plurality of extended ring support members positioned around the device can provide elevation of the base plane equal to the projection of the support members past the base plane. Increased length of the elevation support members relative to the ring support members is shown in FIG. 4. In another embodiment, U-shaped first elevation support member 51 comprises a support section 51c in addition to a first elevation section 51a and a second elevation section 51b. Support sections provide more stable placement when resting on a grate or grill that does not provide a continuous support surface. Many grill surfaces provide significant open area for air flow and heat transfer. The elevation sections, for example 51a and 51b, can be affixed to a spacing ring or a support ring, for example outer spacing ring 22 or outer support ring 32. Additional elevation can be provided by second elevation support member 52, third elevation support member 53, fourth elevation support member 54, and fifth elevation support member 55.

Medial ring support members 91 through 98 are shown connecting medial spacing ring 24 to the medial support ring 34. When the plurality of medial ring support members 91 through 98 are equal in height to inner ring support members 81 through 88 (assuming medial support ring 34 and inner support ring 36 are in a base plane) inner spacing ring 26 is fixed at the same height as medial spacing ring 24. As a matter of geometry, heights and configurations of the spacing rings relative to the support rings can be modified as desired by selecting the height of the various ring support members. The size or shape of the rings can be altered to provide different spacing arrangements.

Figure 3:
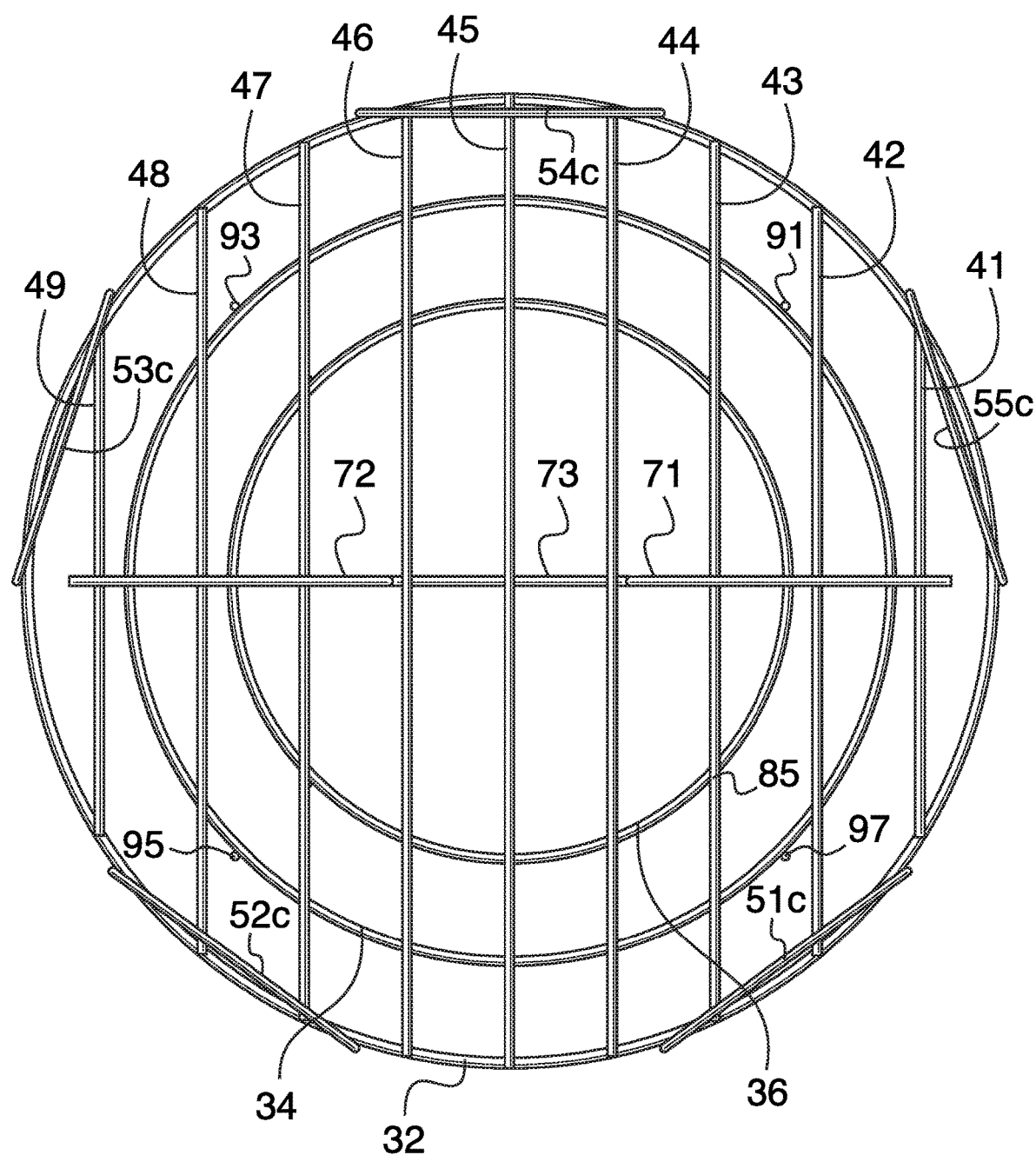
FIG. 3 is a bottom view of a circular cooking support in an embodiment of the invention.

FIG. 3 presents a bottom view of an embodiment of the invention. In this embodiment, five elevation support members are utilized and numbered 51 through 55. Each of the elevation support members can comprise the same structure. Exemplary support section 51c can be arranged secant to the outer support ring 32. Support sections 51c through 55c can be configured in the shape of a pentagon with each support section pointing in a different direction or askew from each other, i.e. not parallel. In a regular pentagon, each differs from the adjacent angle by 108 degrees. However, any non-parallel direction will serve to disparately interact with the grate of a grill surface to prevent part of the device falling into a grill surface that typically features parallel members.

A particular embodiment comprising base support members helps to retain food items. Ninth base support member 49 is shown between outer support ring 32 and medial support ring 34. Eighth base support member 48 is shown, in part, between medial support ring 34 and inner support ring 36. Seventh base support member 47 is shown in part in the central opening.

In an exemplary method of construction, inner support ring 36 is connected to inner spacing ring 26 by welding a plurality of inner ring support members 81 through 88 to form a sub-assembly. Additionally medial support ring 34 and medial spacing ring 24 are connected by welding a plurality of medial ring support members 91 through 98 to form another sub-assembly. Similarly outer support ring 32 can be welded to base support members 41 through 49 and handle support member 70 can be welded to the base support members, for example base support members 41 through 43 and 47 through 49. Outer support ring 32 and outer spacing ring 22 are then joined using elevation support members 51 through 55 and forming a third sub-assembly. The three sub-assemblies can be welded concentrically to form the support structure of the invention.

FIG. 4 presents a perspective view of an embodiment of the invention. Elevation support members can be provided in an alternate embodiment. Elevation support members can be linear and extend past the base plane of the device. For example, elevation support 111 is attached to inner support ring 36 and comprises a distal end spacing extension 113. Elevation support 112 is attached to inner spacing ring 26 and comprises spacing extension 114. Spacing extension 114 can be a cylindrical or rod shaped extension that provides elevation spacing of the base plane where the elevation spacing is equal to the length of spacing extension 114 past the base plane of the device. In another embodiment, elevation support 101 can be connected to outer spacing ring 22 and outer support ring 32 and the distal end can comprise spacing foot 106 that is enlarged to provide additional stability. Elevation support 102 can be connected to outer spacing ring 22 and outer support ring 32 and is shown with spacing foot 107 and elevation supports 103 and 104 are shown with spacing foot 108 and 109 respectively. A distal end of an elevation support can comprise spacing extension 114 or spacing foot 106 or a combination of spacing means can provide elevation spacing and prevent the base plane of the device, including for example outer support ring 32, from resting on a grill surface or drip pan. This ensures that air flow is provided through the food articles in the support structure. Narrow extensions such as spacing extension 114 are more suited for resting on a solid surface such as a drip pan. Spacing extension 125 and spacing extension 126 are shown extending past medial support ring 34 and past the base plane. Spacing extensions can be provided attached to or extending past some or all of the support rings in various embodiments.

FIG. 5 presents a perspective view of an embodiment of the invention comprising a drip pan. A drip pan 200 can be utilized to provide a consistent support by interior surface 201 for the support structure and preventing the feet or elevation support members from passing through the grill or grate. A drip pan can also catch the drippings from cooking food items to facilitate clean up. Drippings and elements that are sticky or burnt can be removed from the grill or smoker via the drip pan and washed in a sink. Liquid can be added to the drip pan to increase the humidity around a food item during cooking. Vertical lip 202 contains liquid or drippings as well as keeps the food support structure centered by encompassing the periphery of the structure. A flavored liquid such as beer or broth can be added to the drip pan to impart flavor to a food item during cooking. A drip pan can also serve as a heat shield from direct heat and provide air flow for indirect cooking. When a food item is placed over a heat source such as charcoal, the heat from the fire moves directly upward and can char or burn food items located above the fire. Indirect cooking can force the heated air to move around and mix with the other air inside the smoker to provide consistent and even cooking.

Handle support member 70 can be utilized to support a food item and can also serve as a handle for the device when vacant. In an embodiment of the invention, handle support member 70 can comprise a first connection portion 71 disposed in the base plane of the device, for example connected to base support members 41, 42, and 43. Handle support member 70 can also comprise a second connection portion 72 disposed in the base plane of the device, for example connected to base support members 47, 48, and 49. In an embodiment of the invention, the connection portion can be attached to the underside of the base support members for greater structural support when lifting the device by handle support member 70. Handle support member 70 is shown with central receiving portion 73 situated in the top plane of the device. Central receiving portion 73 is configured to receive and retain a food item, and can be placed in the cavity of a chicken, or other poultry, to hold the chicken upright within a receiving central opening defined by inner spacing ring 26. The length of the first and second connection portion can be increased to intersect more of the base support members or decreased to intersect less of the base support members. Fourth base support member 44, fifth base support member 45, and sixth base support member 46 are shown extending across a central opening and each can further support food items located in the center of the device as well as provide stability to the device.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A circular food support device for holding food items concentrically above a heat source comprising:
   a first plurality of concentric rings defining a first plane at a device top;
   a second plurality of concentric rings defining a second plane at a device bottom;
   a plurality of ring support members extending from said first plane to said second plane, perpendicular to said first plane and said second plane, and connecting said first plurality of concentric rings to said second plurality of concentric rings so that said first plurality of concentric rings defines a first continuous circular opening configured to receive a food item within said at least one continuous circular opening and a second continuous circular opening concentric to said first continuous circular opening; and
   a plurality of base support members situated in said second plane and fixedly connected to said second plurality of concentric rings at said device bottom and said device bottom is configured for stationary placement on a surface.

2. The device of claim 1 further comprising a plurality of elevation support members wherein each of said elevation support members is U-shaped and comprises a support section disposed between a first elevation section extending from said first plane at said device top to said second plane at said device bottom and a second elevation section extending from said first plane at said device top to said second plane at said device bottom, and said support section is positioned below said second plane to provide elevation spacing between said support section and said second plane.

3. The device of claim 1 further comprising a plurality of elevation support members each having a distal end extending beyond said second plane and configured to provide elevation spacing between said distal end and said second plane.

4. The device of claim 1 wherein said plurality of ring support members are all oriented perpendicular to said first plane and perpendicular to said second plane.

5. A method of constructing the device of claim 1 comprising the steps of:
   attaching a plurality of inner ring support members to a first inner ring and a second inner ring;
   attaching a plurality of medial ring support members to a first medial ring and a second medial ring;
   attaching a plurality of elevation support members to a first outer ring and a second outer ring;
   attaching a plurality of base support members from a first side of said first outer ring to a second side of said first outer ring wherein each of said plurality of base support members are parallel to each other; and
   attaching at least one of said base support members to said first inner ring and said first medial ring to maintain the spacing of said first medial ring between said first outer ring and said first inner ring in said second plane.

6. A food support device for positioning food items concentrically over a combustion source comprising:
   an inner spacing ring connected to an inner support ring by a plurality of inner ring support members wherein said plurality of inner ring support members are perpendicular to said inner support ring;
   a medial spacing ring connected to a medial support ring by a plurality of medial ring support members wherein said plurality of medial ring support members are perpendicular to said medial support ring;
   an outer spacing ring connected to an outer support ring by a plurality of elevation support members;
   said inner spacing ring and said medial spacing ring define a first continuous circular opening configured to receive a first food item;
   said outer spacing ring and said medial spacing ring define a second continuous circular opening configured to receive a second food item;
   at least one base support member extending from a first side of said outer support ring to a second side of said outer support ring and attached to said medial support ring and said inner support ring to define a base plane; and
   wherein said first continuous circular opening and said second continuous circular opening are horizontally concentric and configured to retain said first food item and said second food item concentric to each other and at the same vertical height above said base plane.

7. The device of claim 6 further configured for stationary placement in an enclosed cooking device wherein:
   said plurality of elevation support members each comprise a support section disposed between a first elevation section and a second elevation section;
   said support section extends below said base plane; and
   said first elevation section originates at a connection to said outer spacing ring and said second elevation section terminates at a connection to said outer spacing ring.

8. The device of claim 7 wherein said plurality of elevation support members comprises five or more elevation support members and wherein each support section is oriented at a different angle and none of the support sections are parallel.

9. The device of claim 6 wherein said inner spacing ring, said medial spacing ring, and said outer spacing ring are concentric.

10. The device of claim 9 wherein said inner support ring, said medial support ring, and said outer support ring are concentric.

11. The device of claim 6 further comprising a plurality of base support members extending from a first side of said outer support ring to a second side of said outer support ring and maintaining spacing between said support rings.

12. The device of claim 11 wherein said plurality of base support members are parallel.

13. The device of claim 11 wherein said inner spacing ring defines a central opening configured to receive a food item.

14. The device of claim 13 further comprising:
    a handle support member extending from said plurality of base support members in said base plane to a top plane defined by said inner spacing ring.

15. The device of claim 14 wherein said handle support member comprises:
    a first connection portion residing in said base plane and connected to at least one of said plurality of base support members;
    a second connection portion residing in said base plane and connected to at least one of said plurality of base support members; and a central receiving portion extending linearly in said top plane and parallel to said connection portions and configured to receive and retain a food item.

16. The device of claim 15 further comprising each elevation support member comprising a spacing foot extending beyond said outer support ring.

* * * * *